Aug. 13, 1957 R. W. CARVER ET AL 2,802,418

METHOD OF MAKING COMBINED IDENTIFICATION CARD AND PRINTING PLATE

Filed Oct. 22, 1948 2 Sheets-Sheet 1

INVENTORS
ROBERT W. CARVER and
FRED S. CARVER
BY Joseph A. Schaires
ATTORNEY

INVENTORS
ROBERT W. CARVER and
FRED S. CARVER
BY Joseph A. Schaeves
ATTORNEY 2,802,418

METHOD OF MAKING COMBINED IDENTIFICATION CARD AND PRINTING PLATE

Robert W. Carver, Chatham, and Fred S. Carver, Short Hills, N. J.; said Fred S. Carver assignor to Fred S. Carver, Inc., Summit, N. J., a corporation of New York Application October 22, 1948, Serial No. 55,872

3 Claims. (Cl. 101—401.1)

The present invention relates to combined tamperproof identification cards and printing plates and methods of making the same.

Tamperproof identification cards have for several years employed a sheet of paper, cardboard, plastic or the like, bearing suitable printing, writing and other information for identification purposes, and this sheet has been laminated between two sheets of plastic such as acetate, vinylite or similar thermoplastic. This lamination process is carried out in a press where heat and pressure is applied to soften the plastic and fuse the edges together around the indicia bearing sheet. The plastic also enters the fibrous structure of the sheet.

The present invention contemplates making identification cards of the type above referred to in such a way that the cards may in and of themselves form printing plates by which certain information can be reproduced on extraneous records, such as sales records and vouchers, in a manner similar to that employed in printing addresses on envelopes from address plates.

According to the present invention, no metal parts are present in the finished identification card carried by the card holder and used in making the records. Instead of having the type, from which the printing is to be made, on an independent metal plate, the present invention contemplates having this type formed directly from the plastic material which is employed to make the card tamperproof.

In practicing the present invention, it is possible to provide combined tamperproof identification cards and printing plates in which a sheet or card prepared with words, names, symbols, photographs or devices for identification of the bearer and/or the guarantor may be first prepared in a non-tamperproof form, for example, a printed, typed or signed sheet or card, and then this non-tamperproof identification sheet incorporated into a plastic case, rendered tamperproof and at the same time combined with the printing plate.

Other and further objects will appear as the description proceeds.

The accompanying drawings show for purposes of illustrating the present invention several embodiments in which the invention may take form, together with a method of making the same, it being understood that the drawings are illustrative of the invention rather than limiting the same.

Figure 1:
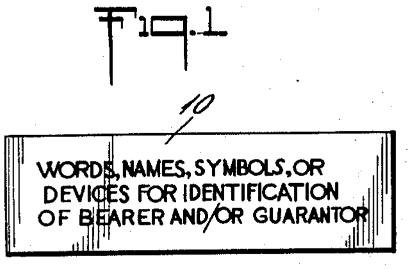
Figure 1 illustrates a sheet or card prepared for identification purposes, but not tamperproofed.
Figure 2:
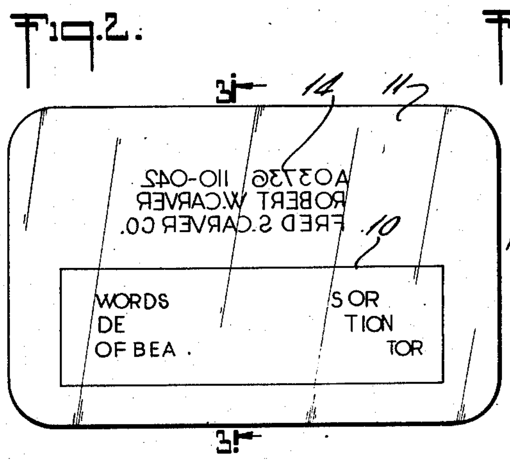
Figure 2 illustrates the sheet of Figure 1 incorporated in a plastic case, rendered tamperproof and provided with integral printing type.
Figure 3:
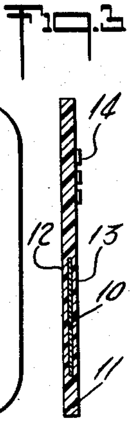
Figure 3 is a sectional view on the line 3—3 of Figure 8, the thicknesses being exaggerated.

The form of article illustrated in Figures 1, 2 and 3 contemplates the use of a sheet of paper, cardboard, plastic or the like, indicated at 10 and bearing suitable words, names, symbols or devices for identification of bearer and/or guarantor. Such information may include names, addresses, code numbers, height, weight, sex, color of hair, eyes, etc. The sheet 10 is somewhat smaller than the finished card 11 illustrated in Figure 2. This finished card employs the non-tamperproof sheet 10 of Figure 1 and two bonded sheets of plastic indicated at 12 and 13. One face of the finished card includes integral plastic printing type in relief as indicated at 14 forming the printing plate. This type may include names, numbers, etc. In the form shown in Figures 1, 2 and 3, the type is in a portion of the area of the finished card not occupied by the paper or other insert so that solid plastic extends from face to face.

Figure 4:
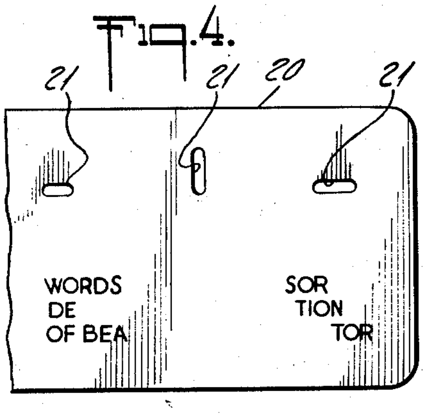
Figure 4 illustrates a modified form of sheet or card prepared for identification purposes but not tamperproofed.
Figure 5:
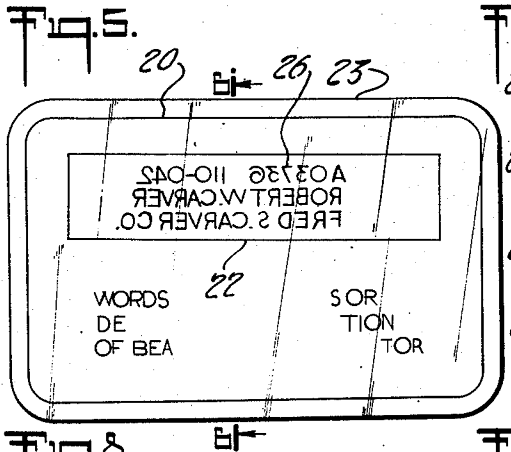
Figure 5 illustrates the sheet or card of Figure 4 incorporated into the plastic case, rendered tamperproof and provided with integral printing type.
Figure 6:
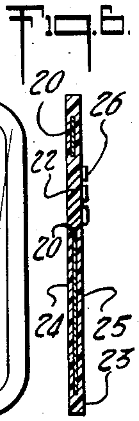
Figure 6 is a sectional view on the line 6—6 of Figure 5.

In the form shown in Figures 4, 5 and 6, the insert sheet 20 is similar to the sheet 10 in that it contains the words, names, symbols, etc., but is made larger. In the area unoccupied by the indicia, it is provided with perforations such as indicated at 21, Figure 4, or a single large opening such as indicated by line 22 in Figure 5. The finished card 23 shown in Figures 5 and 6 has the two bonded sheets 24 and 25 on opposite sides of the sheet 20. It also includes integral plastic printing type in relief as indicated at 26. This type is opposite the region carrying the holes 21 and 22 so that solid plastic extends from face to face.

Figure 7:
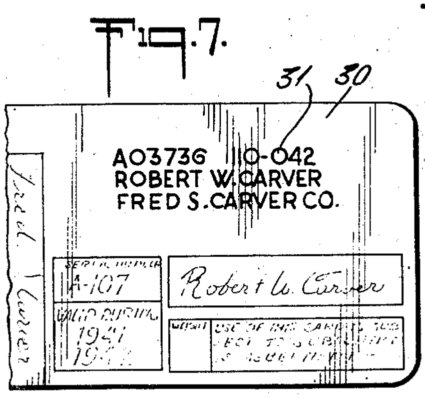
Figure 7 is a front view of a further form of non-tamperproof sheet or card prepared for identification purposes and containing, in addition to the identification indicia, the replica of the printing to be reproduced by the printing type.
Figure 8:
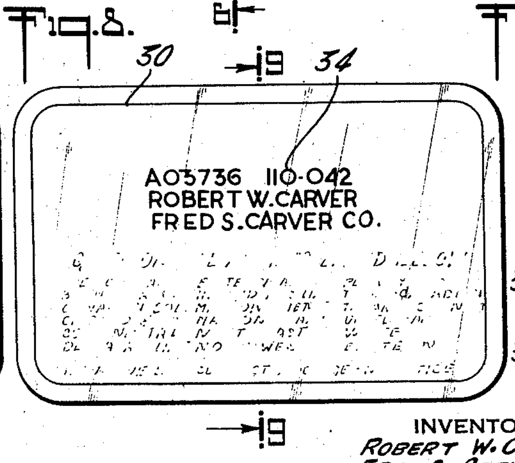
Figure 8 is a rear view of the card of Figure 7 incorporated in a plastic case, rendered tamperproof and provided with integral printing type.
Figure 9:
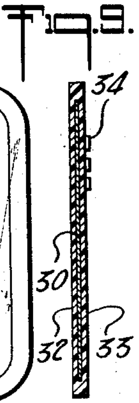
Figure 9 is a transverse sectional view on the line 9—9 of Figure 8.

In the form shown in Figures 7, 8 and 9, the insert is indicated at 30. This sheet carries on its faces suitable standard printed information. It may also be provided with suitable identification information, printed directions, etc. The sheet 30 of Figure 7 also bears at 31 the same printed information which is later to appear as type on the finished tamperproof card. The insert card 30 is laminated between two sheets of plastic indicated at 32 and 33 and provided with the type 34 as before.

In the drawings, the raised printing type is shown on the face of the finished card opposite the reading face through which the indicia on the insert is viewed so as to be readable by reflected light. It is of course equally possible to locate the type on the same face as the readable indicia. It will thus be seen that it is possible to convert the non-tamperproof sheet into a tamperproof identification card which bears readable indicia and includes on one side of the plastic cover or case integral plastic printing type in relief.

Figure 10:
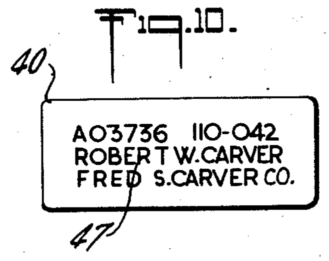
Figure 10 is a front elevational view of a type bearing metal member or matrix prepared to carry the desired type characters.
Figure 11:
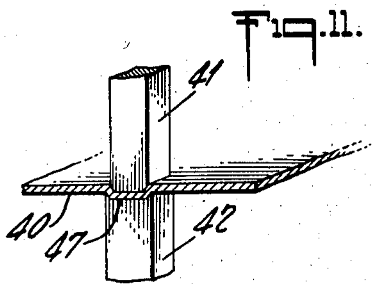
Figure 11 is a diagrammatic view illustrating a process by which the characters may be embossed on a sheet metal plate.
Figure 12:
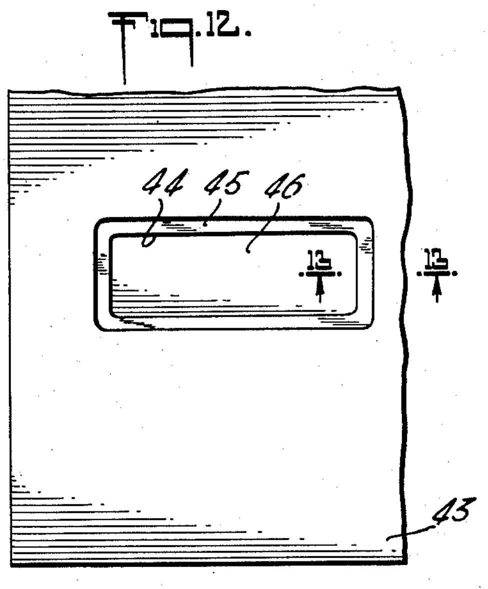
Figure 12 is a top plan view showing a press polishing plate to be used in a laminating press and provided with a recess to receive an embossed sheet metal printing plate.
Figure 13:
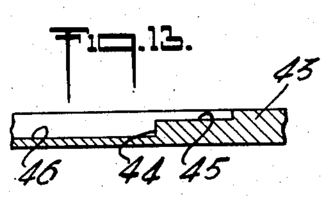
Figure 13 is a cross-sectional view on the line 13—13 of Figure 12.

The manufacture of the tamperproof cards illustrated above involves the preparation of a suitable type carrying matrix, usually metal, in some form which can be used in the laminating press. A simple form of type carrying matrix is a thin sheet metal embossed plate which may be prepared in the usual hand or power operated machine employed for embossing address plates. Such a plate is indicated at 40 in Figure 10. These machines employ a punch 41 and die 42 for each letter or character to be impressed, and by well known mechanism these characters are impressed upon the plate 40 to provide the desired information; for example, the account numbers and identification numbers in the first line, the name of the card holder in the second line, and the name of the guarantor of the account in the third line. The embossed metal plate may be for one individual, in which case it is small as indicated in the drawings, or a large sheet of such soft metal may be employed to carry two or more sets of information, the sets of information being properly spaced for preparing a plurality of cards.

After the embossed printing plate has been prepared, it may be trimmed, if necessary, to size. It may be used as a printing plate in the same way as the usual address plate and is so used to print an insert card such as 30, Figure 7. It may also be so used wherever desired on the insert sheets. Where the multiple name style of plate is employed, the plate itself may become the press polishing plate to be used in the laminating press.

Figure 14:
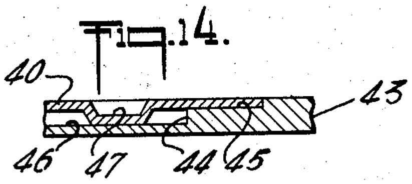
Figure 14 is a section like Figure 13 showing the embossed printing plate in position.
Figure 15:
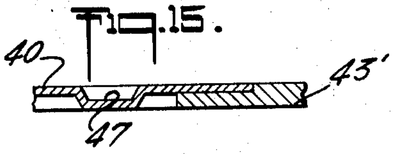
Figure 15 illustrates an apertured press polishing plate carrying the embossed printing plate.

Where, however, the small embossed plate is prepared for a single identification card, it is received in a press polishing plate. Forms of press polishing plates are indicated at 43 and 43' in Figures 12 to 15. The plate 43 has a stepped recess 44 the margin 45 of which is shaped to receive the marginal portions of the printing plate 40 and the deeper portion 46 of which is cut down so as to receive the lettered portion 47 of the printing plate 40. When the printing plate is in the position shown in Figure 14, the lower face of the printing plate reaches the bottom of the recess and one has the printing characters in intaglio. The press polishing plate 43' differs from the plate 43 in that its overall thickness equals the overall of the printing plate.

Figure 16:
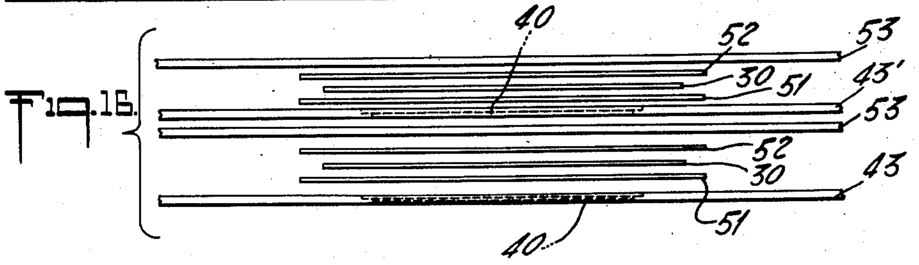
Figure 16 is a view illustrating press polishing plates, together with stacks or sandwiches including the non-tamperproof card and the two sheets of plastic to be used in making the complete card.

The printing plate 40, whether of the single name or multiple name style, is placed in the press (such as shown in Carver Patent 2,404,165 or 2,373,539) with or without polishing plate, as necessary, in such a way that the printing plate is upside down, i. e., the characters are in intaglio. A sandwich composed of the identification sheet 10, 20 or 30, as the case may be, is placed between two sheets 51 and 52 of thermoplastic such as acetate, Vinylite or the like. The plastic sheet which is to cover the indicia on the middle sheet is transparent. The other plastic sheet may be opaque or transparent. Another press polishing plate 53 is placed over the sandwich. Where more than one sandwich is to be processed at a time, additional polishing plates and sandwiches may be stacked in the press. Here one can well use apertured polishing plate 43' as indicated in Figure 16.

After the press is loaded, the charge is submitted to heat and pressure as usual in the process of making laminated tamperproof identification cards. While the heat and pressure are applied, the softened plastic material fuses about the edges of the card 10, 20 or 30, passes through openings or perforations such as 21 and 22 and flows into the depressions in embossed printing plate 40 so as to form a relief design when the laminated identification card is removed from the press.

The embossed sheet metal type of plate is particularly advantageous where the insert card is to bear a printed replica corresponding with the printing to be done when the printing plate is used. It is also inexpensive and readily prepared wherever machines for preparing address plates are available. The cards illustrated in Figures 1 to 6, however, may be made by employing plates in the press of the nature of press polishing plates and having the type information formed in or carried by them in intaglio.

Figure 17:
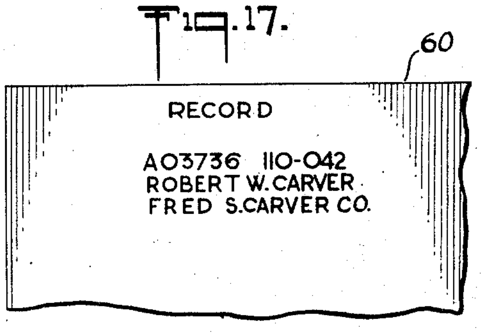
Figure 17 is a diagrammatic view illustrating a record prepared by using a combination card and printing plate as a printing plate.

This identification card can then be carried by the party being identified and used generally as a usual identification card. When the card holder desires to effect a transaction with a third part who recognizes the validity of the card, the third party can take the card, insert it into a card printing machine and use it as a printing plate to print numbers and other data from the card onto the record of the transaction. The card can also be used for printing tickets and the like. Such a record is illustrated at 60, Figure 17.

Since it is obvious that the invention may be embodied in other forms and constructions within the scope of the claims, we wish it to be understood that the particular form shown is but one of these forms, and various modifications and changes being possible, we do not otherwise limit ourselves in any way with respect thereto.

What is claimed is:

1. The method of making a combined tamperproof identification card and printing plate which comprises preparing an indicia bearing sheet, preparing a matrix with printing characters in intaglio, inserting the indicia bearing sheet between two sheets of plastic material larger than the first sheet, placing the matrix and the three sheets in a press and applying heat and pressure to fuse together the plastic sheets and force some of the plastic into the matrix to reproduce the characters thereof in relief.

2. The method of making a combined tamperproof identification card and printing plate which comprises applying heat and pressure to a sandwich consisting of a sheet of indicia bearing material interposed between two sheets of plastic material to fuse the edges and seal the indicia bearing sheet between the sheets of plastic material, and simultaneously forcing a portion of the fused plastic into a matrix in which type characters are in intaglio, and cooling the heated material while under pressure.

3. The method of preparing a tamperproof identification card and printing plate which comprises embossing identification information on a relatively soft piece of sheet metal to form a printing plate, printing the information from said printing plate onto a sheet and applying identifying indicia to the sheet and laminating the sheet between a transparent sheet of plastic adjacent the printed face of the first sheet and a second plastic sheet under heat and pressure in a press carrying the printing plate in position to have its obverse side bear against one of the plastic sheets so that the softened sheet is forced into the characters in the plate to provide a replica in relief suitable for use as a printing plate.

References Cited in the file of this patent

UNITED STATES PATENTS

| | | |
|---|---|---|
| 912,093 | Droitcour | Feb. 9, 1909 |
| 994,705 | Elliott | June 6, 1911 |
| 999,438 | Eberman | Aug. 1, 1911 |
| 1,377,516 | Novotny | May 10, 1921 |
| 1,529,500 | Osborne | Mar. 10, 1924 |

(Other references on following page)

UNITED STATES PATENTS

| | | |
|---|---|---|
| 1,807,957 | Bailey | June 2, 1931 |
| 2,028,711 | Swan | Jan. 21, 1936 |
| 2,071,646 | Melind | Feb. 23, 1937 |
| 2,075,507 | Crowell | Mar. 30, 1937 |
| 2,091,976 | Gollwitzer | Sept. 7, 1937 |
| 2,294,796 | Moulder | Sept. 1, 1942 |
| 2,294,865 | Frankenthal | Sept. 1, 1942 |
| 2,304,631 | Ensing | Dec. 8, 1942 |
| 2,305,127 | Albers | Dec. 15, 1942 |
| 2,305,195 | Richter | Dec. 15, 1942 |
| 2,329,867 | Whitehead | Sept. 21, 1943 |
| 2,363,096 | Sullivan | Nov. 21, 1944 |
| 2,364,870 | Otto | Dec. 12, 1944 |
| 2,370,186 | Oldofredi | Feb. 27, 1945 |
| 2,373,540 | Carver | Apr. 10, 1945 |
| 2,404,165 | Carver | July 16, 1946 |
| 2,600,972 | Comegys | June 17, 1952 |
| 2,645,178 | Brainard et al. | July 14, 1953 |